Oct. 30, 1934. L. E. LA BRIE 1,978,679
BRAKE
Filed Nov. 19, 1928
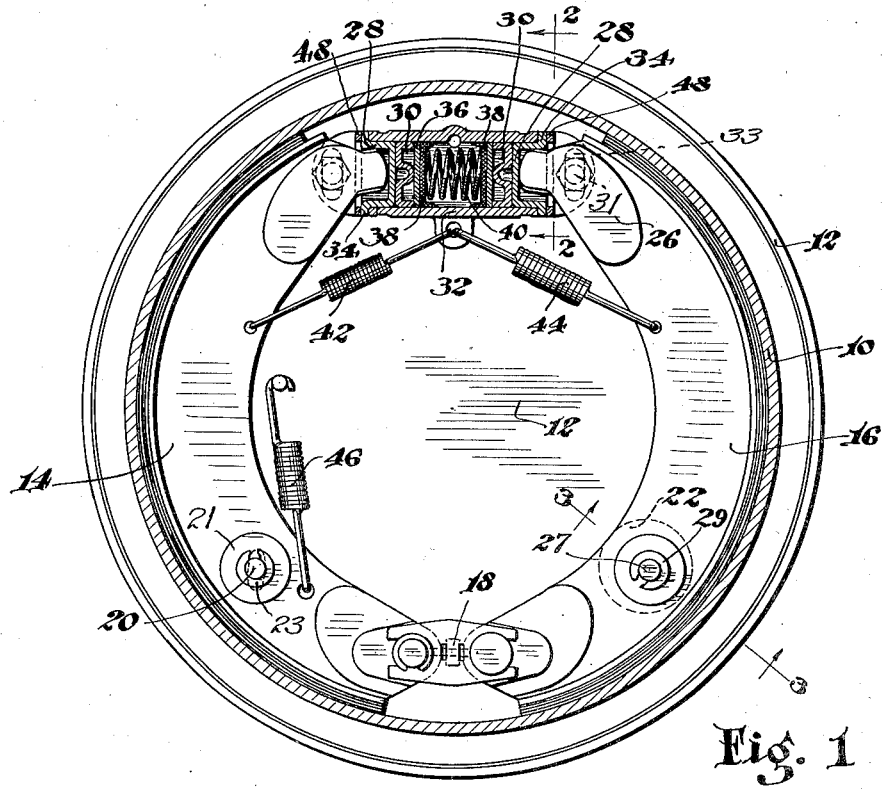
Fig. 1
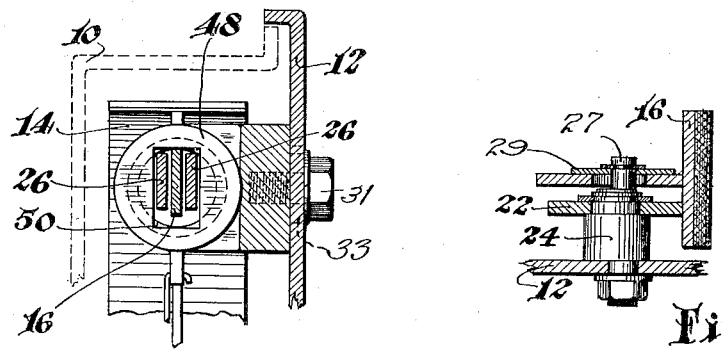
Fig. 2
Fig. 3
INVENTOR.
Ludger E. LaBrie
BY
ATTORNEYS.

UNITED STATES PATENT OFFICE 1,978,679

BRAKE

Ludger E. La Brie, South Bend, Ind., assignor to Bendix Brake Company, South Bend, Ind., a corporation of Illinois Application November 19, 1928, Serial No. 320,286

4 Claims. (Cl. 188—152)

This invention relates to brakes, and is illustrated as embodied in an internal expanding brake for an automobile. An object of the invention is to provide a simplified fluid-power operator, preferably arranged to take the braking torque, and more particularly to arrange the fluid-power operator to apply a friction device of the type having one part which anchors when the drum is turning in one direction and a different part which anchors when the drum is turning in a different direction.

Various features of novelty relate to the anchorage of the friction means on the operating cylinder, to novel means for minimizing undesirable shock due to shifting of the anchorage, to means forming part of the fluid-power actuator and confining the brake shoes laterally, and to other novel and desirable structural and functional features which will be apparent from the following description of the illustrative embodiment shown in the accompanying drawing, in which:

Figure 1 is a vertical section through the brake, just inside the brake drum, and showing the brake shoes in side elevation;

Figure 2 is a partial section on the line 2—2 of Figure 1, showing part of the structure of the fluid-power operator; and Figure 3 is a partial section on the line 3—3 of Figure 1, showing a shoe-positioning device.

The illustrated brake comprises a rotatable drum 10, at the open side of which is a support such as a backing plate 12, and within which are arranged two floating shoes 14 and 16 connected by an adjustable joint 18, or equivalent friction means. Shoe 14 is provided with a steady rest structure comprising a washer 21 mounted on a pin 20 which washer contacts the side of the shoe web and is held in position by a lock washer 23. Shoe 16 is engaged in released position by a positioning device or stop in the form of a roller 22 mounted on an eccentric portion 25 of an adjusting device carried by the backing plate. A pin 27 extending from the portion 25 passes through a slot in the web of the shoe, washer 29 mounted on said pin contacting the side of the web to position the shoe laterally.

At their upper ends, the shoes are provided with plates 26 welded to their opposite sides, and spread in opposite directions away from the shoe web. These plates and the shoe web in each shoe terminate in the same plane, to give a three-point thrust bearing against a cup-shaped part 28 engaging with its base the base of a cup-shaped floating piston 30 in a double-ended cylinder 32 bolted or otherwise adjustably secured by studs 31 to plate 12, the latter being slotted at 33 to receive the studs.

Parts 28 have outwardly-projecting flanges 34 adapted to seat against the ends of the cylinder, to transmit to the cylinder the braking torque of the shoes. Circular plates 36 rest against the walls of pistons 30, being centrally supported if desired by a boss pressed in the base of each piston, and are engaged in turn by cup-shaped packings 38 of rubber or leather or thin flexible metal. A relatively-light spring 40, lighter than the brake return springs, is confined between the packings 38 within the cylinder, and urges the piston assembly yieldingly outward against the ends of the shoes.

A relatively light return spring 42 (somewhat heavier, however, than spring 40) is connected to the forward shoe 14, while a considerably heavier return spring 44 is connected to the rear shoe 16. Thus when the brake is applied, spring 44 holds shoe 16 anchored at all times, and throughout all stages of applying the brake, unless the car is moving backward and the drum 10 is therefore turning clockwise at the time the brake is applied. In this latter case, sufficient pedal pressure to overcome the spring 44 and thus apply the shoe 16 is necessary. The drum friction thereupon further overcomes the tension of spring 44 and moves shoe 16 away from the cylinder, the latter shoe acting with a servo action on the shoe 14 which shoe 14 has been first forced away from the anchor and then wiped back into engagement therewith by the revolving drum. The liquid in the cylinder may, if desired, be made sufficiently viscose to prevent any sudden jar or shock during the anchoring of the shoe 14.

An auxiliary spring 46 may be attached to shoe 14 at such an angle as to counter-balance the weight of the shoes, and to act through joint 18 to hold shoe 16 yieldingly against stop 22.

End plates 48 welded or otherwise secured to parts 28 may, if desired, be provided with rectangular openings 50 through which the ends of the shoes project and which serve to confine the shoe ends laterally.

The motor per se and particularly the cup-shaped pistons arranged therein are also disclosed and are claimed in my copending application Serial No. 728,868, filed June 4, 1934.

While one illustrative embodiment has been described in detail, it is not my intention to limit the scope of the invention to that paricular embodiment or otherwise than by the terms of the appended claims.

I claim:

1. A brake comprising, in combination, a double-ended cylinder, a pair of pistons within the cylinder, parts in the ends of the cylinder having disconnected thrust engagement with the pistons, friction means arranged to anchor on one end when braking in a forward direction and on the other end when braking in a rearward direction and having said ends engaged by the parts in the ends in the cylinder, return spring means urging the ends of the friction means and said parts and the pistons together, and a spring weaker than said return spring means and arranged in the cylinder between said pistons and urging the pistons apart.

2. A brake comprising, in combination, a double-ended cylinder, a pair of pistons within the cylinder, parts in the ends of the cylinder having disconnected thrust engagement with the pistons, friction means arranged to anchor on one end when braking in a forward direction and on the other end when braking in a rearward direction and having said ends engaged by said parts, differentially-tensioned return springs urging the ends of the friction means and said parts and the pistons together, and a spring weaker than said return springs and arranged in the cylinder between said pistons and urging the pistons apart.

3. A brake comprising a fluid-power operator, in combination with a shoe having a web provided with reinforcing plates on its sides which are spread away from the web at the end of the shoe, the ends of the plates and of the web having spaced-apart bearing contact with said operator.

4. A brake comprising, in combination, a cylinder, pistons in the ends of the cylinder, cup shaped parts seated in the cylinder with their bases seated against the pistons and formed with outwardly projecting flanges engageable with the ends of the cylinder, and floating brake shoes having rounded ends seated in said cups, transmitting their braking torque through the flanges to the cylinder.

LUDGER E. LA BRIE.